United States Patent [19]

Nonomura et al.

[11] Patent Number: 4,716,773
[45] Date of Patent: Jan. 5, 1988

[54] STRESS DETECTOR

[75] Inventors: Yutaka Nonomura; Jun Sugiyama; Hirofumi Komatsubara; Masaharu Takeuchi, all of Aichi, Japan

[73] Assignee: Kabushiki Kaisha Toyota Chuo Kenkyusho, Aichi, Japan

[21] Appl. No.: 815,252

[22] Filed: Dec. 31, 1985

[30] Foreign Application Priority Data

Jan. 11, 1985 [JP] Japan ................... 60-3688

[51] Int. Cl.$^4$ ................ G01L 3/10; G01B 7/24
[52] U.S. Cl. ............................ 73/862.36; 73/779; 324/209
[58] Field of Search ............ 73/779, DIG. 2, 862.36, 73/862.69, 862.08; 324/209

[56] References Cited

U.S. PATENT DOCUMENTS 2,912,642 11/1959 Dahle .................. 73/862.36 X
3,498,124 3/1970 Soulant ................. 324/209 X
4,306,462 12/1981 Meixner ................. 73/862.36

Primary Examiner—Charles A. Ruehl
Attorney, Agent, or Firm—Koda and Androlia

[57] ABSTRACT

A stress detector including an AC power source for generating an AC symmetrical wave form voltage, an exciting coil driven by the AC power source for alternatingly magnetizing at least a portion of a ferromagnetic material to be measured in a predetermined direction, a detecting coil for detecting a magnetic flux generated due to the alternating magnetization, and an adder circuit for taking out a part of a voltage applied to the exciting coil, setting an amplitude and a phase of a wave form of the taken-out part of the voltage to preset values, adding the voltage thus obtained to a voltage induced in the detecting coil. The detector gives an output signal representative of a value of stress applied to the material to be measured as a variation either in amplitude or phase depending on the preset phase.

14 Claims, 18 Drawing Figures

STRESS DETECTOR

BACKGROUND OF THE INVENTION

1. Field of the Invention

This invention relates to a magneto-striction type stress detector being high in stress detecting sensitivity and satisfactory in linearity.

2. Description of the Prior Art

There has heretofore been used a method of detecting stress wherein a value of strain generated in a ferromagnetic material due to a stress is detected by use of a magneto-striction effect. According to this test method, as a body to be measured, there are used a test piece made of the ferromagnetic material itself or a test piece of a body to be measured which is attached thereto with a ferromagnetic material. A value of strain is measured by a sensor in which an exciting coil for alternatingly magnetizing this magnetic material in one direction is combined with a coil for detecting a component of a magnetic flux perpendicularly intersecting the exciting direction in the magnetic material.

It is known that a detection signal by this detecting coil includes a variation in amplitude component and a variation in phase component, and a ratio between the both components is varied and not constant with the increase or decrease of a stress. Now, since, in the conventional detector for processing a detection signal by an envelope detection method or a square detection method, only a variation in amplitude component of the detection signal is detected, such disadvantages are presented that the linearity is deteriorated and the sensitivity is lowered. Particularly, even if it is intended to improve the accuracy in the geometric rectangular positional relationship of the both coils to thereby raise the detecting sensitivity, the phase component is neglected. Therefore, such a disadvantage is presented that, on the contrary to the intention, the sensitivity is lowered.

Description will hereunder be given of a conventional example of torque detection from the detection of a torsional stress generated in a shaft with reference to the drawings. The conventional example is shown in FIG. 2. FIG. 3 is a sectional view taken along the line III—III in FIG. 2. A torque sensor 1 of the conventional type includes a U-shaped exciting core 11 disposed in parallel to the axis of a shaft 2 to be measured and a detecting core 12 perpendicularly intersecting the exciting core 11 and magnetically separated from the exciting core 11. The exciting core 11 is wound therearound with an exciting coil 111 and the detecting core 12 is wound therearound with a detecting core 121. The shaft 2 to be measured itself is constituted by a ferromagnetic material.

The detecting sensor 1 is adapted to detect a stress generated in the shaft 2 to be measured through a detection circuit shown in FIG. 4. Here, an AC (alternating current) power source 31 is adapted to generate a sine wave voltage, an output from the AC power source 31 is applied to the exciting coil 111 and alternatingly magnetizes the shaft 2 to be measured. When a stress is generated in the shaft 2 to be measured, a magnetic flux is generated in a direction perpendicularly intersecting the exciting direction under a magneto-striction effect, and a magnitude of the magnetic flux is detected by the detecting coil 121 as an induced voltage. A signal by this induced voltage is amplified in an AC amplifier 32, thereafter, subjected to an envelope wave detection for example, in a wave rectifier 33, and an amplitude component is outputted. A signal wave form at a point A and an output voltage at a point B in FIG. 4 are shown in FIGS. 5 and 6, respectively. In addition, a graphic chart in FIG. 5 shows a change in wave form of an AC signal with an applied torque at the point A, indicating the conditions of the amplitude and the phase simultaneously. Wave form curves x1, x2 and x3 indicate that applied torques are −5 kgm torque to the left (inverse direction), zero torque (0 Kgm) and 5 kgm torque to the right, respectively. The frequency of the wave form is equal to the frequency of an exciting voltage applied to the exciting coil 111, i.e. the alternating voltage of the AC power source 31. Furthermore, in the graphic chart of FIG. 6, an applied torque value to the right or left is given as an abscissa and an output voltage at the point B is given as an ordinate. As the applied torque varies from the left to the right, the output voltage increases, whereby an applied torque value to the shaft to be measured from this output voltage value is found.

However, as apparent from FIG. 5, the wave form of the AC signal is varied in both amplitude and phase due to an applied torque, and the interaction therebetween depends upon the applied torque, whereby, as apparent from FIG. 6, the relationship between the applied torque and the output voltage is of non-linearity, whereby it is difficult to accurately seek the applied torque only from the output voltage, and, in order to accurately measure, it is necessary to use a complicated linearizing circuit or a linear calculation.

The following reasons lead to the above-described phenomenon.

Notwithstanding, here, description will be given with a simple model of a cosine wave. This model is easily realized with a filter circuit and the like, and, even with a complicated wave form such as a triangular wave, if Fourier analysis is applied thereto, explanation can be made similarly.

If a component of the detection signal depending upon the torque from the detecting sensor is $f_1$, then $f_1$ can be represented by the following equation.

$$f_1 = A_1(T) \cos(\omega\tau + \phi_1) \quad (1)$$

where $A_1(T)$ is an amplitude dependent upon a torque, $\omega$ an angular velocity, $\tau$ a time, and $\phi$ a phase.

In practice, simultaneously with $f_1$, there is a component $f_2$ of the detection signal not dependent upon the torque, which is represented by the following equation $$f_2 = A_2 \cos(\omega\tau + \phi_2) \quad (2)$$

where $A_2$ is the amplitude not dependent upon the torque.

A detection signal $f_0$ is represented by the following equation.

$$\begin{aligned} f_0 &= f_1 + f_2 \\ &= A_1(T)\cos(\omega\tau + \phi_1) + A_2\cos(\omega\tau + \phi_2) \\ &= A_0(T)\cos(\omega\tau + \phi_0(T)) \end{aligned} \quad (3)$$

provided that $$A_0(T) = \{A_1(T)^2 + A_2^2 + 2A_1(T)A_2 \cos(\phi_1 - \phi_2)\}^{\frac{1}{2}} \quad (4)$$

$$\phi_0(T) = \cos^{-1}\frac{A_1(T)\cos\phi_1 + A_2\cos\phi_2}{|A_0(T)|} \quad (5)$$

In consequence, in general, both the amplitude $A_0(T)$ and the phase $\phi_0(T)$ are complicated functions of the torque (T), and consequently, each of the amplitude $A_0(T)$ and the phase $\phi_0(T)$ is not in proportion to the torque (T).

However, when a condition of that $\cos(\phi_1-\phi_2)=\pm 1$ is established, the above-mentioned equations (4) and (5) are developed to the following equations $A_0(T)=|A_1(T)\pm A_2|$ (the reference numerals are arranged in the order of the present condition) (6)

$\phi_0(T)=C_0(\phi_1$ is a reference basis; $C_0$ is a constant not dependent upon the torque) (7)

Thus, a linear output is obtained only by the detection of the amplitude value, and the phase is not varied. However, in general, the condition of that $\cos(\phi_1-\phi_2)=\pm 1$ is not established.

SUMMARY OF THE INVENTION

The present invention has been developed to obviate the above-described disadvantages of the prior art and has as its object the provision of a stress detector having a simplified construction, and yet, capable of detecting with high accuracy, with no use of a linearizing circuit of the relationship between a stress and an output voltage.

The stress detector according to the present invention features that:

the stress detector comprises: an AC power source for generating an AC symmetrical wave form voltage such as a sine wave, a triangular wave or the like; an exciting coil driven by the AC power source for alternatingly magnetizing at least a portion of a ferromagnetic material to be measured in a predetermined direction; a detecting coil for detecting a magnetic flux generated due to the aforesaid alternating magnetization; and an adder circuit for taking out a part of a voltage applied to the exciting coil, setting the amplitude and the phase of a wave form of the taken-out part of the voltage to preset values, adding the voltage thus obtained to a voltage induced in the detecting coil, and giving an output signal representative of:

a value of stress in the ferromagnetic material to be measured as a variation either in amplitude or phase depending on the preset phase.

In this stress detector according to the present invention, the body to be measured should be a ferromagnetic material because the measurement is performed by magnetizing the body to be measured. When the body to be measured is not a ferromagnetic material, a ferromagnetic material should be attached to the surface of the body to be measured. The objects to be measured should be ones having a flat or a curved surface, including a bolt, a nut, a shaft, a crankshaft of a vehicle, a steering shaft and a wheel, for example.

With the above-described arrangement, in the stress detector according to the present invention, the interrelation between a variation in the amplitude component and a variation in the phase component of an output signal from the detecting coil for detecting a stress is converted into only one of these component variations to be outputted. For this reason, the relationship between the stress applied and the output voltage is high in linearity and also high in detecting sensitivity, so that necessity of using the expensive conventional linearizing circuit, or discriminating the phases is eliminated. In consequence, the stress detector can be simplified in construction and high in accuracy.

This can be realized by producing the conditions shown in the equations (6) and (7).

The added signal $f_3$ represented by the following equation.

$$f_3 = A_3 \cos(\omega\tau + \phi_3) \quad (8)$$

When this is added to $f_0$, the signal $f_4$ after the adding is represented by the following equation.

$$f_4 = f_0 + f_3 \quad (9)$$
$$= f_1 + f_2 + f_3$$
$$= A_4\cos(\omega\tau + \phi_4(T))$$

Since $f_2+f_3$ are signals not dependent on the torque, $f_2+f_3$ are represented in the following equation.

$$f_2+f_3 = A_5 \cos(\omega\tau+\phi_5) \quad (10)$$

In consequence, $$f_4 = A_1(T)\cos(\omega\tau+\phi_1) + A_5\cos(\omega\tau+\phi_5) \quad (11)$$

Here, if $$\cos(\phi_1-\phi_3)=\pm 1 \quad (12)$$

then, $$A_4 = |A_1(T) \pm A_5| \quad (13)$$

$$\phi_4(T) = 0 \quad (14)$$

As a result, a linear output can be obtained from a value of amplitude. In this case, the phase is not varied.

$\phi_5$ can be controlled by the added signal $f_3$, whereby this condition can be realized by this invention.

Furthermore, in the case of using an output of variation in phase, if $$\cos(\phi_1-\phi_5)=0, \{A_1(T)| < |A_5| \quad (15)$$

then, an amplitude $A_4$ and a phase $\phi_4(T)$ of the signal $f_4$ after the adding are represented by the following equations, respectively.

$$A_4 = \sqrt{A_1^2(T) + A_5^2} \quad (16)$$

$$\phi_4(T) = \cos^{-1}\frac{A_1(T)}{\sqrt{A_1^2(T) + A_5^2}} \quad (17)$$

($\phi_5$ is a reference basis)

Here, $|A_1(T)| < |A_5|$, so that the equation (17) is represented by the following equation.

$$\phi_4(T) \approx \cos^{-1}\frac{A_1(T)}{A_5^2} \quad (18)$$

As a result, a torque value can be obtained from a variation in phase.

When the torque value becomes negative, that is in the reverse direction, the amplitude $A_1(T)$ of the output $f_1$ of an ideal ferromagnetic material due to the magneto-striction effect becomes nevgative, whereby the output $f_1$ is inverted and detected as in a wave form shifted by $\pi$ in phase. This action cannot be discriminated by a simple detecting method. In consequence, unless a complicated circuit arrangement such as a phase-detecting circuit it has been impossible to discriminate. However, according to this method, if the value of $A_5$ is set to be $A_1(T) \pm A_5 < 0$ over all the region of torques in the equation (13), then no phenomenon of inversion occurs, so that the linear output can be easily obtained over all the region of torques.

DETAILED DESCRIPTION OF THE INVENTION

Detailed description will hereunder be given of the embodiments of the present invention with reference to the accompanying drawings.

The First Embodiment

Figure 7:
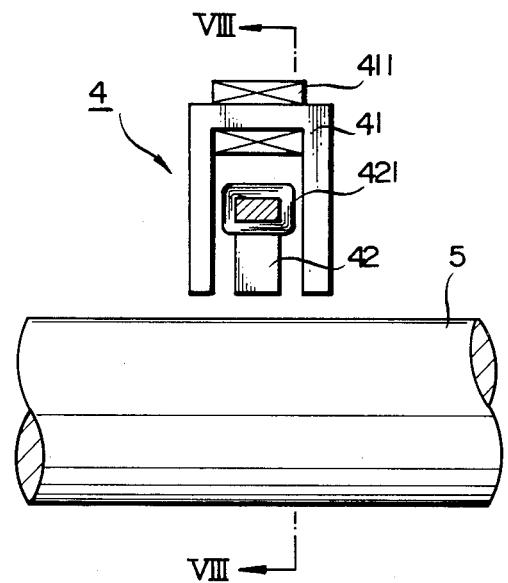
FIG. 7 is a view showing an example of the construction of the stress detecting sensor in the stress detector according to the present invention.

This embodiment shows a detector for detecting a torsional stress generated in a shaft. FIG. 7 shows the construction of the stress detecting sensor of this detector, FIG. 8 is the sectional view taken along the line VIII—VIII in FIG. 7, and FIG. 1 is the block diagram showing the detection circuit of this detector.

Figure 8:
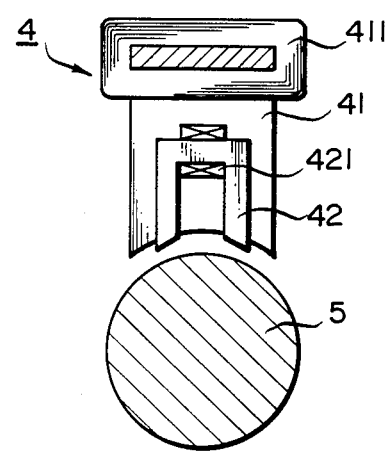
FIG. 8 is a sectional view taken along the line VIII—VIII in FIG. 7.

In FIGS. 7 and 8, the stress detecting sensor 4 includes a U-shaped exciting core 41 disposed in parallel to a shaft 5 as being the shaft to be measured. The sensor 4 further includes a detecting core 42 as being a separate magnetic circuit from the exciting core 41 and perpendicularly intersecting the exciting core 41. The exciting core 41 is wound therearound with an exciting coil 411, and the detecting core 42 is wound therearound with a detecting coil 421.

Figure 1:
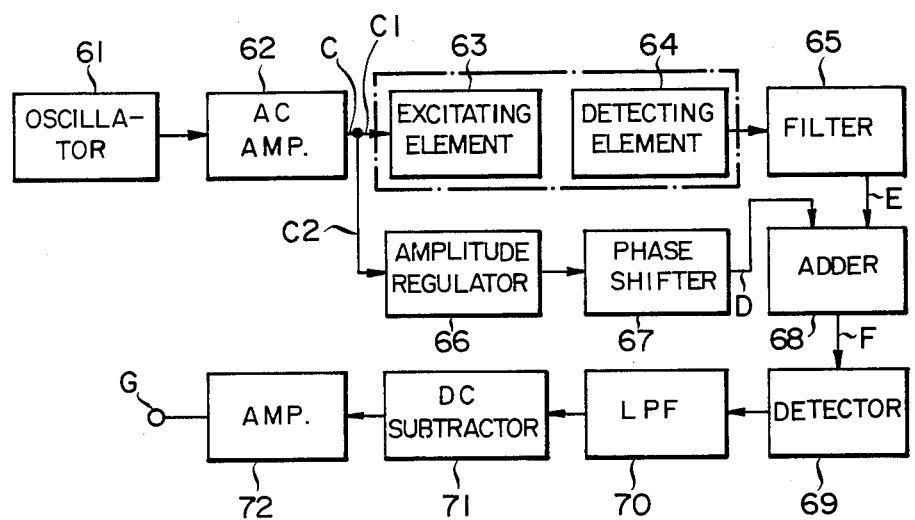
FIG. 1 is a block diagram showing an example of the arrangement of the detection circuit of the stress detector according to the present invention in a first embodiment.
Figure 4:
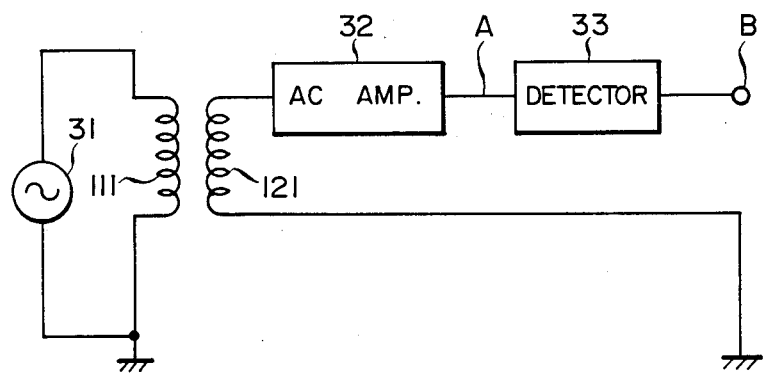
FIG. 4 is a block diagram showing the arrangement of the detection circuit in the conventional stress detector.
Figure 2:
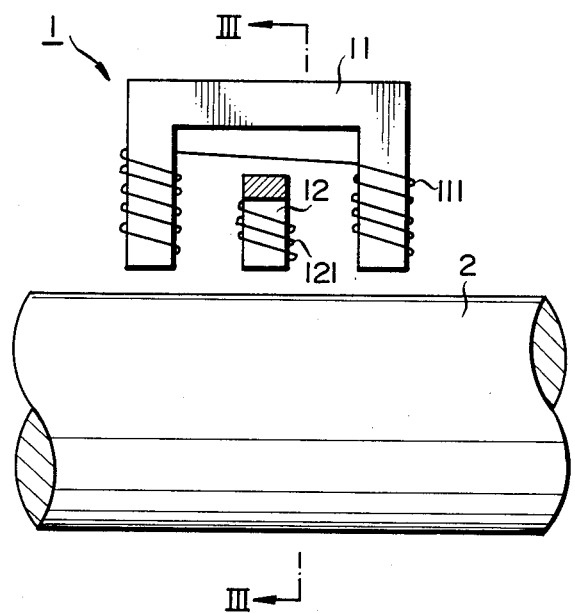
FIG. 2 is a view showing an example of the construction of the stress detecting sensor in the conventional stress detector.
Figure 3:
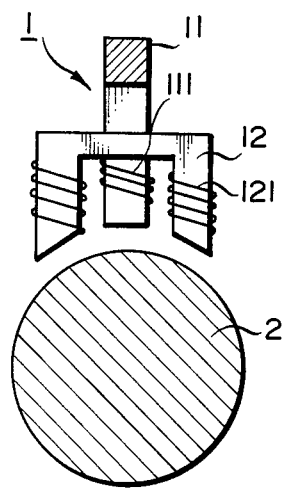
FIG. 3 is a sectional view taken along the line III—III in FIG. 2.
Figure 5:
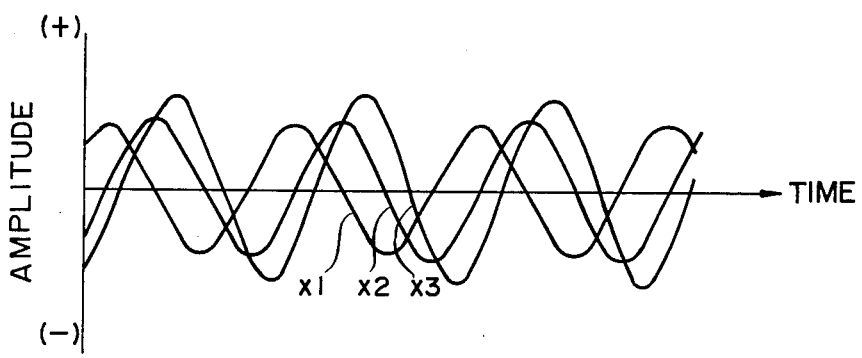
FIG. 5 is a graphic chart showing the signal wave form at the point A in FIG. 4.
Figure 6:
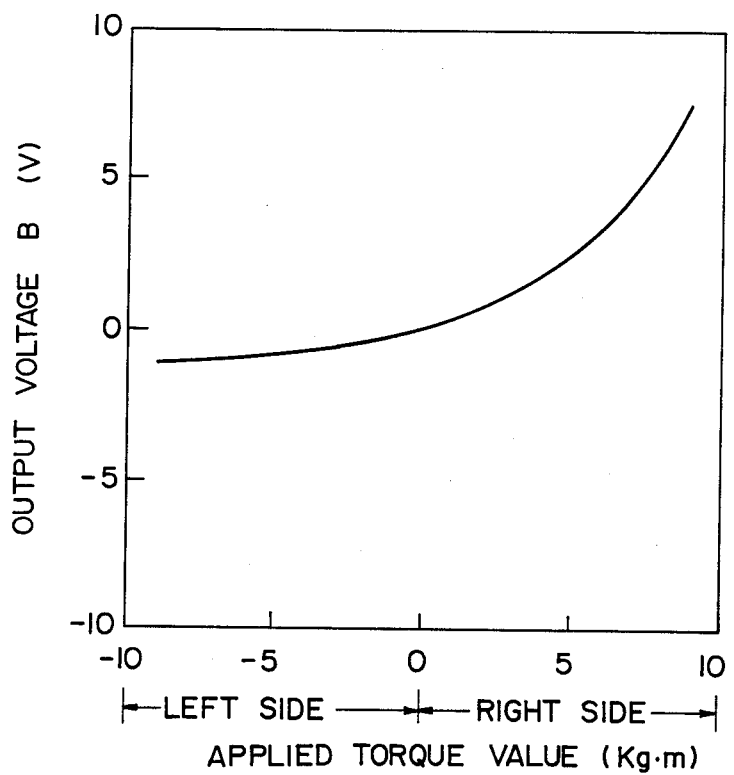
FIG. 6 is a graphic chart showing the condition of the final output in the conventional stress detector.

Furthermore, in FIG. 1, an oscillator 61 is adapted to generate an AC symmetrical wave form voltage such as a sine wave or a triangular wave, and an output from this oscillator 61 is applied through an AC amplifier 62 to a sensor exciting element 63 corresponding to the exciting coil 411 shown in FIGS. 7 and 8 (signal C1). A sensor detecting element 64 corresponds to the detecting coil 421 shown in FIGS. 7 and 8, and an induced voltage from which higher harmonics of the secondary order or more has been removed by a harmonic rejector 65 and fed to a signal adder 68 as one E of input signals. Furthermore, an output C2 branched from an output C of the AC amplifier 62 is regulated in amplitude to a preset value of amplitude by an amplitude regulator 66, thereafter, caused to lead or lag in phase to a preset phase value by a phase shifter 67, and fed to the signal adder 68 as the other D of input signals. In consequence, inputted to the signal adder 68 are the inputs of two types D and E from the harmonic rejector 65 and the phase shifter 67. The inputs of two types D and E are added in the signal adder 68 and the signal F is outputted. The signal F is rectified through a wave detector 69, and a low-pass filter 70. Thereafter, a preset value of an offset DC voltage generated due to the circuit processing is subtracted from the output from the low-pass filter 70 by a DC voltage subtractor 71. Subsequently, an output from the DC voltage subtractor is amplified into a voltage output suitable for the display or the control by an amplifier 72, and the final output G can be obtained.

Figure 9:
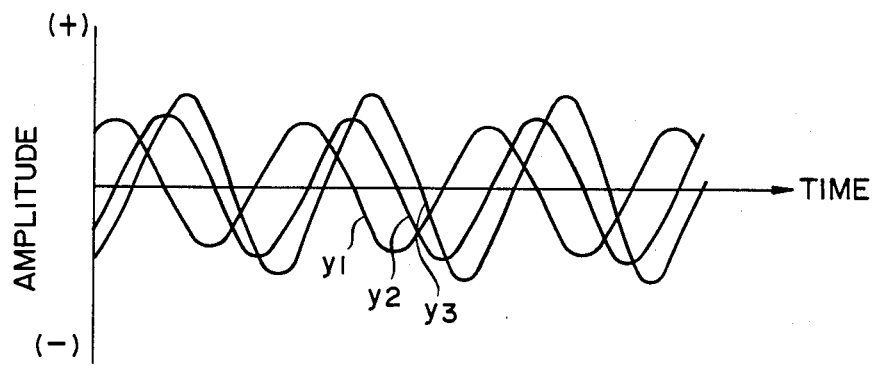
FIG. 9 is a graphic chart showing the signal wave form of a detection signal E in the stress detector according to the present invention.
Figure 10:
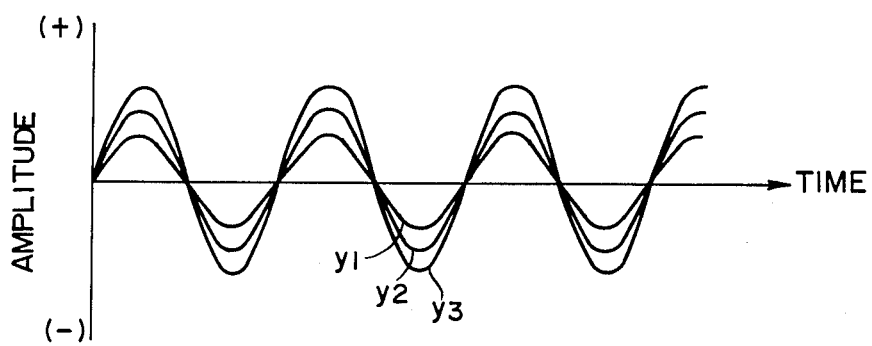
FIG. 10 is a graphic chart showing the signal wave form of a signal F after the adding in the stress detector according to the present invention.
Figure 11:
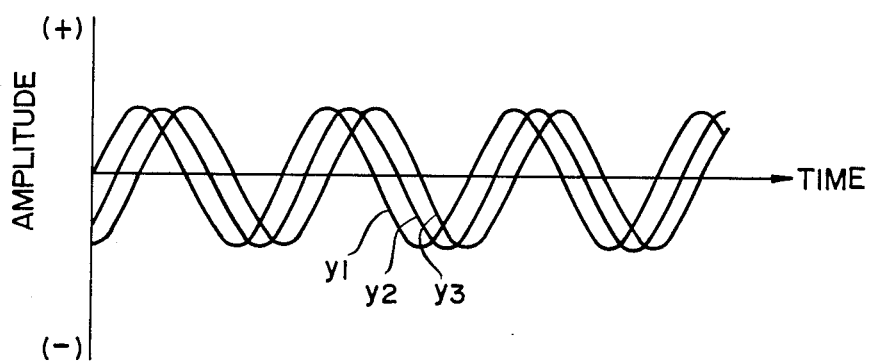
FIG. 11 is a graphic chart showing the signal wave form of a signal F after the adding under another preset condition in the stress detector according to the present invention.
Figure 12:
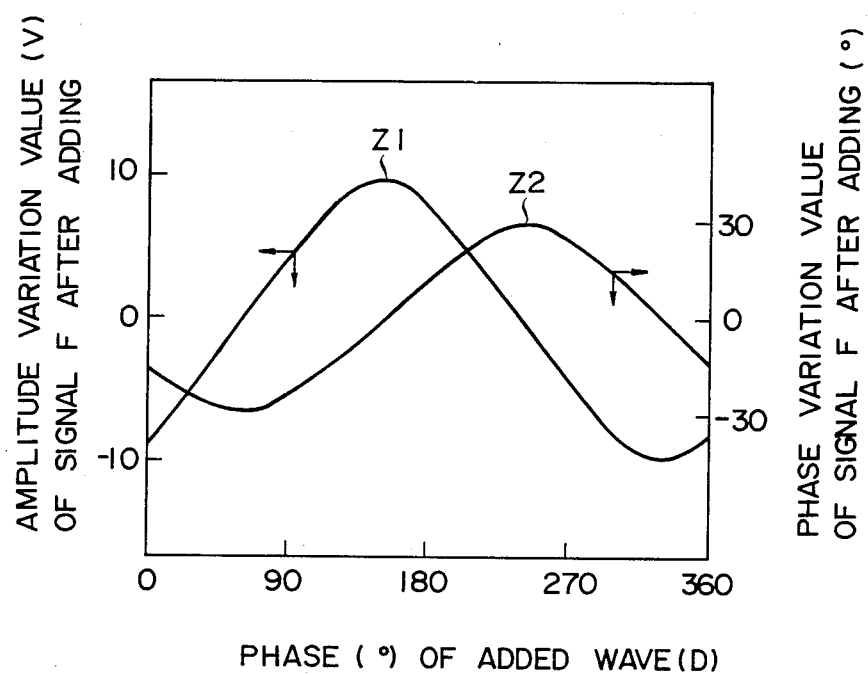
FIG. 12 is a graphic chart showing the relationship between a variation value in amplitude, a variation value in phase of the signal wave form of the signal F after the adding and an added wave signal D in the stress detector according to the present invention.

Subsequently, the action of this circuit will be described with reference to the wave form drawings in from FIG. 9 to FIG. 12. Additionally, FIG. 9 is a wave form of the AC voltage signal E in FIG. 1, FIG. 10 is a wave form of the signal F after the adding (when the phase of the signal D is 150°), FIG. 11 shows a wave form of the signal F when the phase different from the case of FIG. 10 is set (the phase of the signal D is 240°)

and in all of the above drawing figures, the wave form curves y1, y2 and y3 have the applied torques 5 kgm to the left, zero torque, and 5 kgm to the right, respectively. Furthermore, FIG. 12 shows the dependance of a variation value in amplitude and a variation value in phase of the signal F after the adding upon phases of the added signal D set by the phase shifter 67 referenced to a phase of the exciting voltage C. Referring to the drawing, a curve $Z_1$ indicates a variation value in amplitude, and a curve $Z_2$ a variation value in phase.

Firstly, the output from the oscillator 61 is made to be a sine wave having a constant frequency and a constant amplitude. This sine wave is power-amplified by the AC amplifier 62, and further, branched. The output signal C1 thereof is fed to the sensor exciting element 63 to excite the shaft 5 of the ferromagnetic material to be measured by an alternating magnetic field. An AC voltage signal induced by the magnetic flux perpendicularly intersecting the alternating magnetic field is outputted by the sensor detecting element 64. This AC voltage signal is varied in amplitude and phase by a torsional stress due to the counterclockwise or clockwise torque applied to the shaft 5. Subsequently, this AC voltage signal is inputted by the harmonic rejector 65 to the signal adder 68 as the signal E having only the component of the basic frequency equal to the frequency oscillated by the oscillator 61. As shown in FIG. 9, this AC voltage signal E is a sine wave variable in wave form by an applied torque.

On the other hand, the signal C2 branched from the AC voltage signal power-amplified by the AC amplifier 62 is converted into one having a preset amplitude through the amplitude regulator circuit 66, further, caused to lead or lag in phase to a preset phase by the phase shifter 67, and fed to the signal adder 68 as the signal D. This AC voltage signal D is a sine wave having no relation to the applied torque. The AC voltage signals of two types D and E are added by the signal adder 68. The wave form of the signal F after the adding becomes a sine wave, as shown in FIGS. 10 and 11. A variation in amplitude and phase of the wave F with the torque applied to the shaft 5 is varied due to the preset condition in phase of the added wave signal D. For example, when the phase of the added wave signal D is 150°, as shown in FIG. 10, the wave form of the signal F after the adding is varied only in amplitude but not in phase. Furthermore, when the phase of the added wave signal D is 240°, as shown in FIG. 11, the wave form of the signal F after the adding is varied in phase but not in amplitude.

FIG. 12 shows the relationship between the phase of the aforesaid added wave signal D and the variation value in amplitude or phase of the signal F after the adding (The curve $Z_1$ is the variation value in amplitude and the curve $Z_2$ the variation value in phase). Additionally, the variation value in amplitude of the left ordinate is the difference where an amplitude value of the signal F at the time when the torque of 5 kgm is applied is subtracted from an amplitude value of one at the time when the torque of 5 Kgm is applied. Furthermore, the variation value in phase of the right ordinate is the difference where a phase value at the time when the torque of 5 kgm is applied is subtracted from a phase value at the time when the torque of 5 Kgm is applied.

As shown in FIG. 12, the variation values in amplitude and phase of the signal F after the adding due to the applied torque depends upon the phase of the added wave signal D. For example, if the phase of the added wave signal D is set at 60° or 240°, then the amplitude is not varied and only the phase is varied as shown in FIG. 11. On the contrary, if the phase of the added wave signal D is set at 150° or 330°, then the phase is not varied and only the amplitude is varied as shown in FIG. 10.

The dependability of the variation values in amplitude and in phase of the signal F after the adding due to the applied torque value upon the phase of this added wave signal D is varied in a ratio between the amplitude of the added wave signal D and the amplitude of the AC voltage signal E from the sensor detecting element. In order to make the added wave signal F controllable and stable, it is necessary to set the amplitude of the added wave signal D to a preset value. It is desirable that this preset value is set within a value of the ratio of $0.01 \sim 100$ between the amplitude of the added wave signal D and the amplitude of the AC voltage signal E from the sensor detecting element. In order to obtain the amplitude varying output, it is necessary tha the condition of the equation (12) is established. In order to obtain the phase varying output, it is necessary that the condition of the equation (15) is established. To establish this condition, if the added signal $f_3$ is higher in amplitude than the detection signal $f_0$, then the tunable range is expanded, the setting is easy and the controllability is high. In practice, this means that the value of the amplitude ratio of $1 \sim 100$ is suitable. However, when the component $f_2$ of the detection signal $f_0$ not dependent on the torque is smaller than the component $f_1$ of the detection signal $f_0$ dependent only on the torque, the amplitude value of the added signal $f_3$ may be small. In consequence, in this case, to establish the aforesaid condition, it is suitable that the value of the amplitude ratio between the added signal $f_3$ and the detection signal $f_0$ is $0.01 \sim 1$. Additionally, in this embodiment the value of the ratio is set at 10.

In consequence, when the phase of the added wave signal D is set at 150° by the phase shifter 67, the signal F after the adding has the characteristics of being varied only in amplitude by the applied torque. The signal F is outputted as the final output G through the wave detector 69 according to the simple envelope detection method or the square detection method, the low-pass filter 70, the DC voltage subtractor 71 and the amplifier 72. This final output G can be obtained by wave-detecting the AC voltage signal F obtained by completely converting the variations in amplitude and phase varied by the applied torque into a variation in amplitude. This output G is satisfactory in linearity, and moreover, high in sensitivity and accuracy.

As described above, the stress detector according to the present invention is capable of obtaining a linear output with a simplified construction, with no need of a linearizing circuit and the like.

The Second Embodiment

Figure 13:
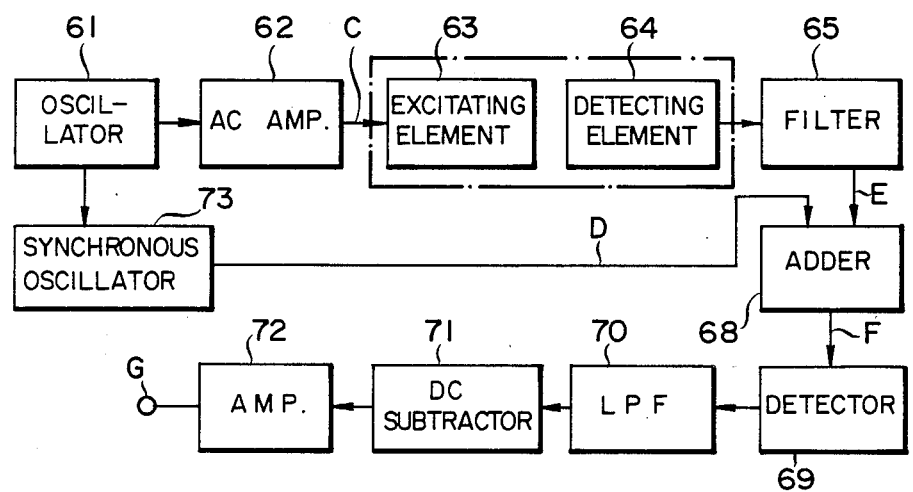
FIG. 13 is a block diagram showing an example of the arrangement of the detection circuit of the stress detector according to the present invention in a second embodiment.

FIG. 13 is the block diagram showing the detection process circuit of the stress detector in this embodiment. This stress detector is similar to the one in the first embodiment except that a synchronous oscillator 73 is provided instead of the amplitude regulator 66 and the phase shifter 67 in the first embodiment shown in FIG. 1.

The synchronous oscillator 73 is referenced from an oscillation signal from another oscillator, generates an AC symmetrical wave form voltage identical with or different from the wave form from the aforesaid oscillator at the same frequency, and the amplitude and the phase of the AC voltage output can be set independently of each other. The synchronous oscillator 73 is connected to the oscillator 61 to be synchronized therewith, and the output therefrom is inputted to the signal adder 68 as the added wave signal D.

The added wave signal D is an AC symmetrical wave form voltage set in amplitude and phase by the synchronous oscillator 73. The phase of the output D of this synchronous oscillator 73 is set at any one of 60°, 150°, 240° and 330° as shown in FIG. 12, whereby the same result as in the first embodiment can be obtained. Further, the setting of the amplitude and phase of the added wave signal D can be set easier than in the first embodiment.

Figure 14:
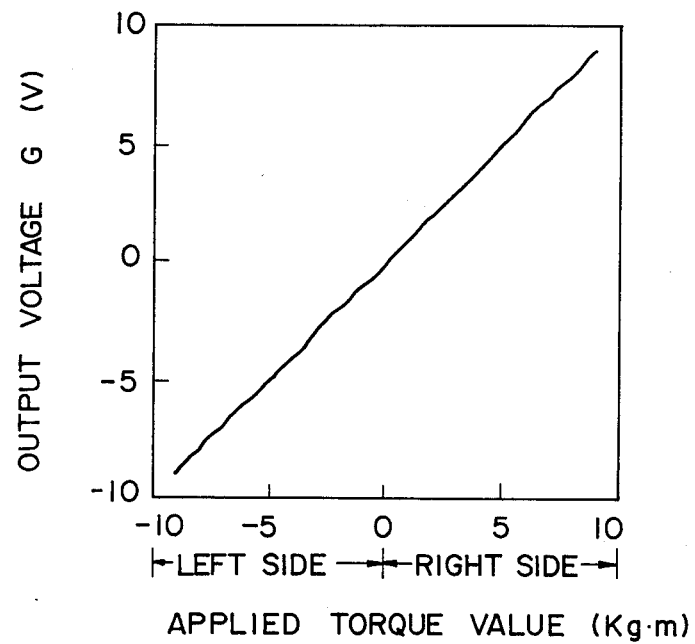
FIG. 14 is a graphic chart showing the relationship between the final output signal and the torque in the stress detector according to the present invention.

FIG. 14 shows the result of the measurement of the voltage output G obtained by applying a torque to the shaft 5 when the phase of the output D of the synchronous oscillator 73 is set at 150° by use of this stress detector.

As apparent from FIG. 14, a linearity of the output voltage G is satisfactory.

As described above, the stress detector according to the present invention can obtain a satisfactorily linear output voltage to a stress.

The Third Embodiment

Figure 15:
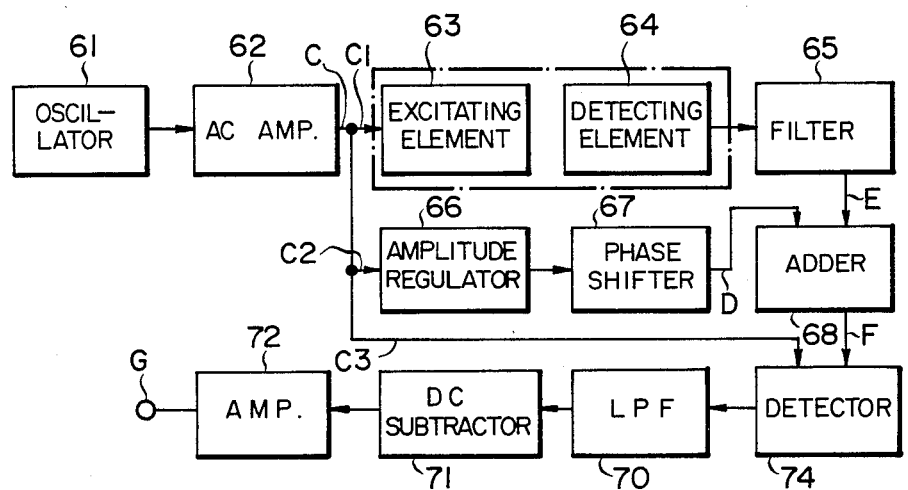
FIG. 15 is a block diagram showing an example of the arrangement of the detection circuit of the stress detector according to the present invention in a third embodiment.

FIG. 15 is a block diagram showing the detection process circuit of the stress detector in this embodiment. This stress detector is similar to the one in the first embodiment except that a phase difference detector 74 is provided in place of the wave detector 69 in the first embodiment shown in FIG. 1.

The phase difference detector 74 is adapted to detect a phase difference between the two AC wave form voltages, has two inputs including one input fed thereto with the signal F obtained by adding the wave signal D to the AC voltage signal E from the sensor detecting element 64 and the other input fed thereto with the output signal C3 branched from the output voltage C of the AC amplifier 62.

In this embodiment, the phase of the added wave signal D is set at 60° or 240° in FIG. 12, and the amplitude of the added wave signal D is set at a preset value. In consequence, as shown in FIG. 11, the signal F after the adding has the characteristics of being not varied in amplitude as a variation in the torque applied to the shaft 5, but varied only in phase. Here, the phase of the signal F after adding is detected as referenced to the phase of the AC signal voltage C3 branched from the AC signal voltage C outputted from the AC amplifier 62, by use of the phase difference detector 74, so that a variation in phase as commensurate as the value of torque applied to the shaft 5 can be detected.

As compared with the first and the second embodiments, an advantage of this embodiment is that a stress applied can be detected as a variation in phase of the signal F after the adding.

Figure 16:
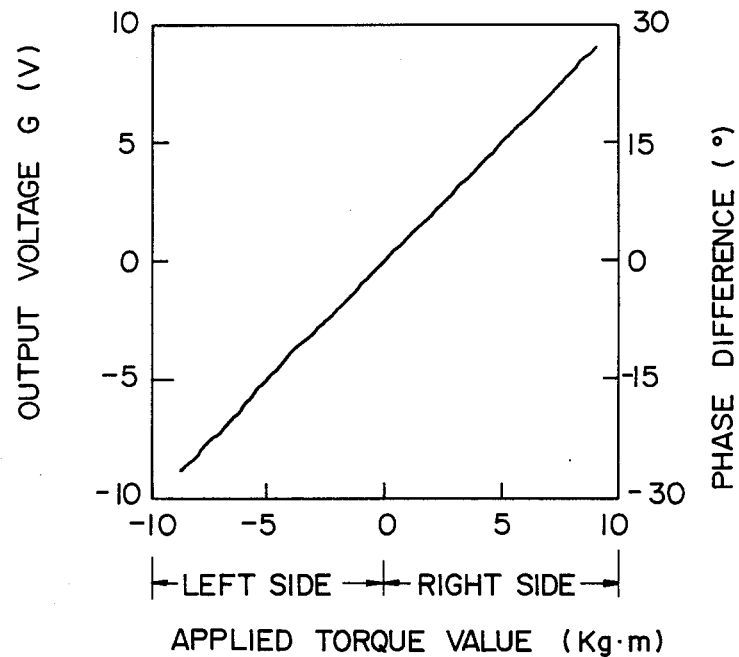
FIG. 16 is a graphic chart showing the relationship between the final output signal and the torque in the stress detector according to the present invention.

The output voltage G obtained by applying a torque to the shaft 5 has been measured by use of this stress detector, with the phase of the added wave signal D to the output C of the AC amplifier 62 being set at 240°. The result is shown in FIG. 16. Additionally, in FIG. 16, a phase variation of the output F from the signal adder 68 is simultaneously indicated as ordinate to the right.

As apparent from FIG. 16, the relationship between the output voltage G i.e. the variation in phase, and the applied torque is linear.

As described above, the stress detector according to the present invention can obtain a satisfactorily linear output voltage to the stress.

In this embodiment, similarly to the second embodiment, the AC symmetrical wave form voltage having the amplitude and phase preset may be inputted to the signal adder 68 as the added wave signal D.

Furthermore, the aforementioned description has been given using the phase difference detector 74 as outputting the phase difference as an analogue voltage. However, instead of it, a digital counting circuit may be used as a digital output.

The Fourth Embodiment

Figure 17:
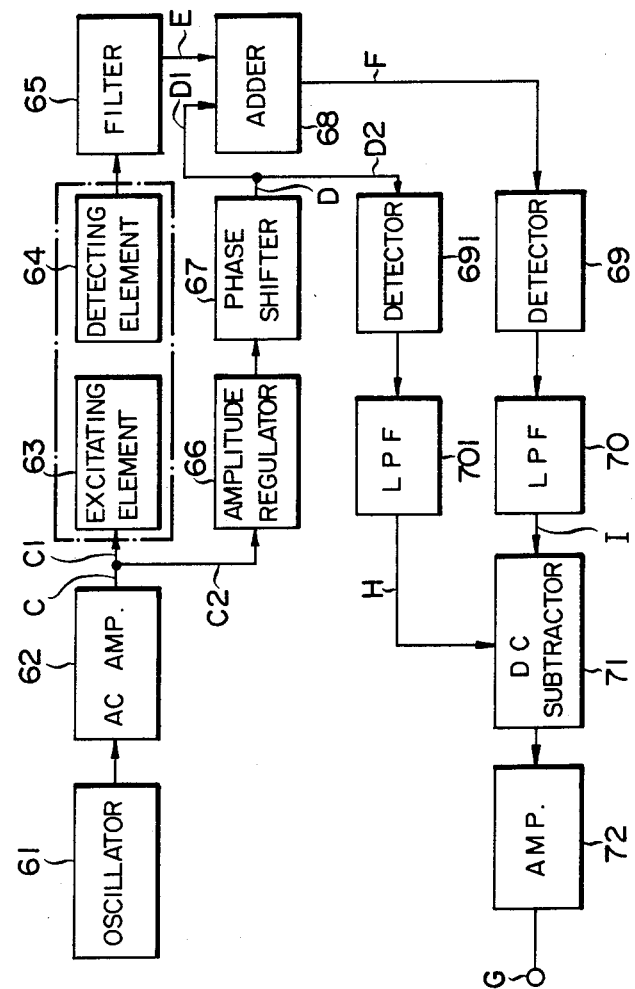
FIG. 17 is a block diagram showing an example of the arrangement of the detection circuit of the stress detector according to the present invention in a fourth embodiment.

FIG. 17 is the block diagram showing the detection process circuit of the stress detector in this embodiment. This stress detector is similar to the one in the first embodiment except that the added wave signal D outputted from the phase shifter 67 in FIG. 1 of the first embodiment is branched, feeds one D1 of the branched signals to the signal adder 68, and also feeds the other D2 of the branched signals to a DC voltage subtractor through a wave detector 691 and a low-pass filter 701. It is intended to effectively compensate an offset voltage generated during the circuit processing, especially during the adding. The other D2 of the branched signals is converted into a DC signal H by the low-pass filter 701 through the wave detector 691, and, fed to the DC voltage subtractor 71, where the DC signal H is subtracted from a signal voltage I resulted from the processing described in the first embodiment. Here, this signal H is a voltage having no relation to the applied torque.

In this embodiment, the DC voltage signal H converted by the wave detector 691 and the low-pass filter 701 is subtracted by the DC voltage subtractor 71 from the DC voltage I obtained from the signal F after the adding by the wave detector 69 and the low-pass filter 70, so that the adverse influences of fluctuations and drift of the added wave signal D can be eliminated. In the sensor signal I converted into a DC voltage after the adding, a component by the added wave signals D superposed occupies a high rate. When the fluctuations and drift from the preset value of the amplitude value of the added wave signal D are present, the output G has a high fluctuation and drift. In this embodiment, the subtraction makes it possible to remove the offset voltage, and simultaneously, eliminate the fluctuations and drift by the added wave signal D.

According to this embodiment, a highly stable output can be obtained against the fluctuations from the present amplitude value of the added wave signal D, moreover, the setting accuracy of the preset amplitude value of the added wave signal D can be lowered, and the setting of the value can be easily made. Furthermore, the value added due to the signal processing is subtracted, so that the ideal characteristics of sensor can be outputted apparently.

Figure 18:
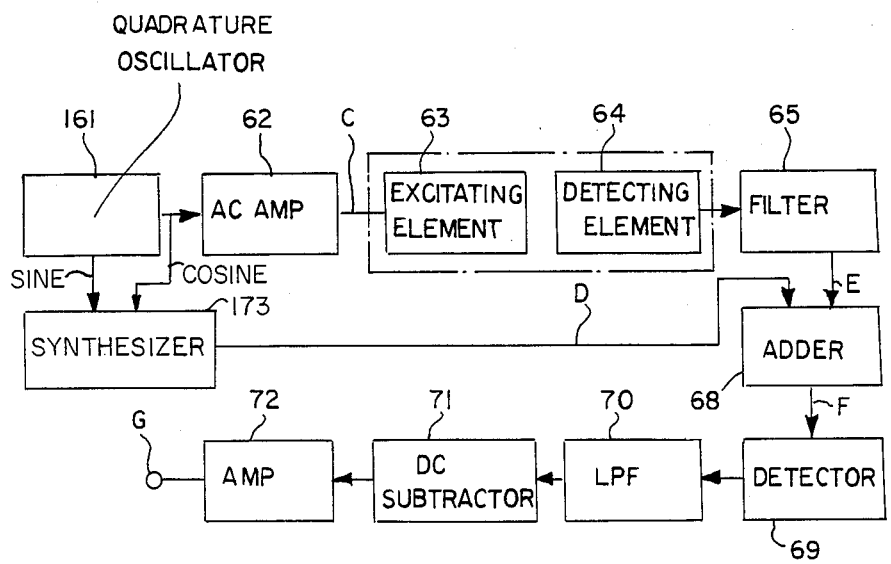
FIG. 18 is a block diagram showing an example of the arrangement of the stress detector according to the present invention in a fifth embodiment.

FIG. 18 is a block diagram showing an example of the arrangement of the stress detector according to the present invention in a fifth embodiment. Instead of the oscillators 61 and the synchronous oscillators 3 in the second embodiment, an oscillator such as a quadrature oscillator 161 and a synthesizer 173 as shown in FIG. 18 are used. A sine wave and cosine wave having a phase difference 90 therebetween are simultaneously produced by the quadrature oscillator 161 in synchronism with each other. One of the outputs is fed to the AC amplifier 62 while a sine wave and a cosine wave are combined into a synthesized wave by the synthesizer 173 in which the amplitude and the phase are set to preset values and fed to the signal adder 68.

From the first to the fourth embodiments, the final output G is made to be zero when the torque is zero, however, the reference voltage may be set at a voltage other than zero. In setting such a voltage other than zero, it suffices to change the setting of the subtraction value of the DC voltage subtractor 71.

Furthermore, the range of variation of the final output due to the applied torque may be set at a value suitable for the display or the control, and the setting can be easily performed by use of the amplifier 72.

Further, cross-shaped cores have been used as the exciting core and the detecting core, however, instead of these, two ring-shaped cores surrounding the body to be measured may be provided, one of the cores being used as the exciting core and the other as the detecting core. Further, a plurality of cores may be combined with each other as the exciting core group and the detecting core group, and cores of various shapes each having a plurality of poles may be used.

In the stress detector, a stress applied to a body is measured by use of a magneto-striction effect, where a detected wave is varied in amplitude and phase due to a stress. In the stress detector according to the present invention the detector wave is, however, converted into the output of a variation in the component of either the amplitude or the phase through the circuit processing, so that the relationship between the stress and the output voltage can be made to be a linear one.

In consequence, the stress detector can be simplified in construction and easily regulated without requiring a complicated and expensive linearizing circuit. Since the stress detector has a simplified construction, noises are decreased, and both the sensitivity and the accuracy are very high.

What is claimed is:

1. A stress detector comprising:
   an AC power source for generating an AC symmetrical wave form voltage;
   an exciting coil driven by said AC power source for alternatingly magnetizing at least a portion of a ferromagnetic material to be measured in a predetermined direction;
   a detecting coil for detecting a magnetic flux generated due to said alternating magnetization;
   an adder means for taking out a part of a voltage applied to said exciting coil, setting an amplitude and a phase of a wave form of the taken-out part of the voltage to preset values, adding the voltage thus obtained to a voltage induced in said detecting coil, and giving an output signal representative of a value of stress in said ferromagnetic material as a variation either in amplitude or phase depending on the preset phase; and
   a wave detecting means which outputs a linear voltage signal representative of the stress fluctuation of said ferromagnetic material by detecting said signal outputted from said adder means.

2. A stress detector as set forth in claim 1, wherein said adder means comprises:
   an amplitude regulator for regulating an amplitude value outputted from said AC power source to the preset value;
   a phase shifter for shifting a phase outputted from said amplitude regulator to the preset phase; and
   an adder for adding a voltage from said phase shifter to the voltage induced in said detecting coil and for outputting amplitude component-variable signals;
   and further characterized in that said wave detecting means does not use synchronizing signals.

3. A stress detector as set forth in claim 2, wherein said preset value of said phase is so selected that said adder means gives the signal representative of the value of stress as a variation in amplitude, and said wave detecting means comprises:
   a wave detector for detecting a voltage from said adder means, and
   a low-pass filter for removing noises of the voltage from said wave detector.

4. A stress detector as set forth in claim 3, wherein said wave detecting means further comprises:
   a DC voltage subtractor connected to said low-pass filter, for subtracting an offset DC voltage from the voltage of said low pass filter.

5. A stress detector as set forth in claim 4, wherein said wave detecting means further comprises:
   a second wave detector for detecting the voltage from said phase shifter, and
   a second low-pass filter connected to said second wave detector and to said DC voltage subtractor for removing noises of the voltage from said second wave detector and providing the resultant voltage to said DC voltage subtractor,
   thereby removing an offset voltage generated during processing through said adder means.

6. A stress detector as set forth in claim 5, wherein said wave detecting means further comprises:
   an amplifier for amplifying the voltage from said DC voltage-subtractor to provide a voltage suited for display or control.

7. A stress detector as set forth in claim 1, wherein said adder means comprises:
   a synchronous oscillator synchronized with said AC power source, for outputting an AC voltage set in amplitude and phase to the preset values independently of each other; and
   an adder for adding the voltage from said synchronous oscillator to the voltage induced in said detecting coil.

8. A stress detector as set forth in claim 1, wherein said AC power source and a part of said adder means comprise a quadrature oscillator in which a sine wave and a cosine wave having a phase difference of 90° therebetween are produced, one of said sine and cosine waves being applied to said exciting coil, and said sine and cosine waves are combined into a synthesized wave in which the amplitude and the phase of the wave form are set to the preset values and are added to said voltage induced in said detecting coil.

9. A stress detector as set forth in claim 1, wherein said preset value of said phase is so selected that said adder means gives the signal representative of the value of stress as a variation in phase, and said wave detecting means comprises:
   a phase difference detector connected to said adder means and said AC power source, for detecting a phase difference between the voltage from said adder means and a voltage from said AC power source as a reference.

10. A stress detector as set forth in claim 9, wherein said wave detecting means further comprises:
- a low-pass filter for removing noises of the voltage from said phase difference detector,
- a DC voltage subtractor for subtracting an offset DC voltage from the voltage of said low-pass filter, and
- an amplifier for amplifying the voltage from said DC voltage subtractor to provide a voltage suited for display or control.

11. A stress detector as set forth in claim 1, wherein said amplitude is set within a ratio of an amplitude of said voltage induced in said detecting coil to an amplitude of said voltage to be added thereto in said adder means, said ratio being 1:0.01 to 100.

12. A stress detector as set forth in claim 1, wherein said wave detecting means consists of an envelope wave detector or a square-law wave detector which detects only the amplitude component of the signal outputted from said adder means.

13. A stress detector as set forth in claim 1, wherein said wave detecting means consists of a phase difference wave detector which detects only the phase component of the signal outputted from said adder means.

14. A stress detector as set forth in claim 1, wherein said wave detecting means further comprises a low pass filter for noise elimination.

* * * * *